United States Patent Office 3,256,325
Patented June 14, 1966

3,256,325
PROCESS FOR THE PRODUCTION OF α-CHLOROGLUTARIC ACID
Ryoichi Wakasa and Kazuo Saotome, Tokyo, Japan, assignors to Asahi Kasei Kogyo Kabushiki Kaisha, Osaka, Japan, a corporation of Japan
No Drawing. Filed Aug. 14, 1962, Ser. No. 216,716
Claims priority, application Japan, Aug. 15, 1961, 36/28,879
4 Claims. (Cl. 260—531)

This invention relates to a process for producing α-chloroglutaric acid, starting from 1,1,1,5-tetrachloropentane.

α-Chloroglutaric acid is an intermediate for synthesis of glutamic acid which is known as chemical condiments. It is well known that α-chloroglutaric acid readily yields DL-glutamic acid through amination with ammonia or others.

An object of the invention is to provide a novel process for the production of α-chloroglutaric acid with commercial advantage, starting from 1,1,1,5-tetrachloropentane. Other objects would be apparent from the following description.

So far, synthesis of 1,1,1,5-tetrachloropentane was considered difficult. But, this compound has become to be readily synthesized by telemerization of ethylene and carbon tetrachloride.

According to the invention, α-chloroglutaric acid is produced with a high yield, by the following equations starting from this compound.

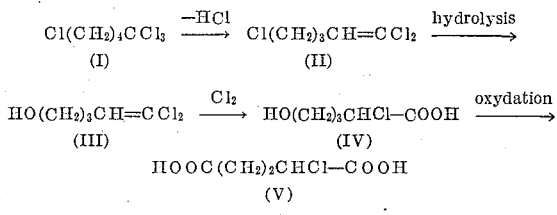

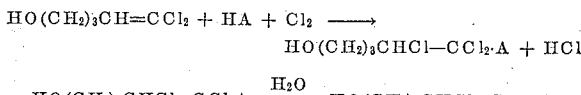

$$HOOC(CH_2)_2CHCl-COOH$$
(V)

As obvious from the above formula, the process of the invention comprises four steps of reactions. In the first step, 1,1,1,5-tetrachloropentane (I) is heated under anhydrous condition in the presence of a so-called Friedel-Crafts catalyst to be subjected to de-hydrogen chloride reaction to form 1,1,5-trichloropentane-(1) (II). The trichloromethyl radical in the compound (I) is reactive to electrophilic reagent, such as Friedel-Crafts type catalyst, and is subjected to de-hydrogen chloride reaction under anhydrous condition to form dichlorovinyl radical. While, the chloromethyl radical is inactive to electrophilic reagents.

As to Friedel-Crafts catalyst, aluminum chloride, ferric chloride, tin tetrachloride, boron trifluoride, zinc chloride, and the like, may be used.

When the compound (I) is heated at a temperature of 60–70° C. for 3 hrs. with a few percent (wt.) of anhydrous ferric chloride, the reaction proceeds smoothly generating hydrogen chloride gas. From the reaction mixture, 1,1,5-trichloropentane-(1) is distilled under reduced pressure in a higher yield.

In the second step, 1,1,5-trichloropentene-(1) (II) is heated with an aqueous alkaline solution, such as sodium hydroxide or carbonate solution, thereby chlorine atom in the chloromethyl radical being hydrolyzed to hydroxyl radical, and 1,1-dichloro-5-hydroxypentene-(1) (III) being formed. In this reaction, the chloromethyl radical in the compound (II) is reactive to a nucleophilic reagent such as alkali and is easily subjected to hydrolysis to be changed to primary alcohol group. While, the dichlorovinyl radical is inactive to nucleophilic reagents and remains unreacted. Alternatively, the compound (II) may be refluxed with an alkali salt of aliphatic carboxylic acid such as sodium acetate in carboxylic acid solution to be once changed to carboxylate of the compound (III) and then hydrolysed to the compound (III). At any rate, the second step of the process of the invention is effected according to the condition known to those skilled in the art for the conversion of chloromethyl radical to hydroxymethyl radical through the hydrolysis in the broader meanings.

For example, 1,1,5-trichloropentene-(1) is heated at 150° C. for 5 hrs. in an autoclave with its twice volume of 10% sodium carbonate aqueous solution under vigorous stirring. From the reaction mixture, after extraction with benzene, 1,1-dichloro-5-hydroxypentene-(1) is distilled under reduced pressure in a good yield.

The thus produced 1,1-dichloro-5-hydroxypentene-(1) (III) is converted to α-chloro-δ-hydroxyvaleric acid (IV) according to the third step of the process of the invention.

Thus, the compound (III) is subjected to chlorine-addition in acidic medium by being treated with acidic compound and chlorine, whereby the dichlorovinyl radical in the compound (III) is added with acid and chlorine at its double bond, probably according to the folowing equations:

$$HO(CH_2)_3CH=CCl_2 + HA + Cl_2 \longrightarrow$$
$$HO(CH_2)_3CHCl-CCl_2 \cdot A + HCl$$

$$HO(CH_2)_3CHCl-CCl_2A \xrightarrow{H_2O} HO(CH_2)_3CHCl-COOH$$

where A represents the acid residue. In this reaction, phosphoric acid, formic acid, acetic acid or others may be employed instead of sulfuric acid. Among the acidic compounds available for the process of this invention, sulfuric acid, formic acid and acetic acid are found to be preferable. Upon pouring of the reaction mass into water, preferably into ice water, the addition product is hydrolyzed to carboxy-chloromethyl radical to yield the compound (IV). For this reaction, the compound (III) is mixed with concentrated sulfuric acid under cooling, and then chlorine gas is passed through the mixture, whereby the chlorine gas is converted by sulfuric acid to hydrogen chloride in situ, which is added to the double bond along with sulfuric acid.

For example, the compound (III) is dissolved in concentrated sulfuric acid (about twice of its volume) under cooling with ice-water. Through this solution, chlorine gas is passed at a temperature of 5–10° C. until the evolution of hydrogen chloride gas ceases (for 2 or 3 hrs.).

The reaction product, after hydrolysis with ice-water, is extracted with a solvent such as chloroform or carbon tetrachloride. The extract, without further purification, is subjected to the next reaction, the oxidation to hydroxyl radical.

The thus resulting α-chloro-δ-hydroxyvaleric acid (IV) is then converted to α-chloroglutaric acid (V) according to the fourth step of the process of the invention. In this step, the hydroxymethyl radical in the compound (IV)

is oxidized to carboxyl radical. For that purpose, a suitable oxidizing agent and condition to oxidize primary alcohol to carboxyl radical may be employed. Among suitable oxidizing agents, such are involved as permanganate salts, bichromate salts, anhydrous chromic acid, nitric acid, nitrogen dioxide, and the like. Since the chlorine atom in the $\alpha$-chloroglutaric acid product is unstable and readily subjected to hydrolysis in aqueous solution, especially in alkaline aqueous solution, it is desirable to conduct the oxidation reaction in non-alkaline, i.e. neutral or acidic, medium, and preferably in the substantial absence of water. For instance, it is convenient that the reaction product in the third step of the process is extracted with a suitable solvent such as chloroform, carbon tetrachloride, and the like, and the resulting solution is subjected to oxidation with nitrogen dioxide at a comparatively lower temperature, with a higher yield.

As described above, the process of the invention permits the production of $\alpha$-chloroglutaric acid with a higher yield, starting from 1,1,1,5-tetrachloropentane which is easily synthesized from ethylene and carbon tetrachloride through telomerization, and using low-priced reagents in all of the four steps comprising de-hydrogen chloride, hydrolysis, chlorine-addition in acidic mediums and hydrolysis, and oxidation.

The process of the invention will be more concretely described with reference to the following examples, which are, however, set forth merely by way of illustration and not by way of limitation.

EXAMPLE 1

A mixture of 210 g. of 1,1,1,5-tetrachloropentane and 3 g. of anhydrous ferric chloride is stirred for 3 hours at a temperature of 55° to 60° C. The reaction mixture is washed with water, then dried, and distilled in vacuo to yield 148 g. of 1,1,5-trichloropentene-(1) at 72°–74° C./10 mm. Hg (the yield being 90% of the theoretical amount) and 10 g. of unreacted tetrachloropentane. The reaction product, 1,1,5-trichloropentane, is mixed with 130 g. of potassium acetate and 170 ml. of glacial acetic acid, and the mixture is refluxed for 12 hours. The reaction mixture is washed with water, and the washings is extracted with benzene. The oily layer and the benzene extract are combined and distilled in vacuo to yield a fraction boiling at 83°–85° C./5 mm. Hg. The fraction is refluxed with sodium hydroxide-containing aqueous methanol for hydrolysis, to yield 118 g. of 1,1-dichloro-5-hydroxypentene-(1), boiling at 65°–68° C./2 mm. Hg, yield being 90.5% of the theoretical amount. The 1,1-dichloro-5-hydroxypentene-(1) is mixed with 200 g. of 96% sulfuric acid while being cooled. Chlorine gas is passed through the mixture at about 10° C., thereby hydrogen chloride gas being generated in situ and the reaction proceeding. Three hours later, the reaction mixture is poured into ice water, and the mixture is extracted with chloroform. The chloroform extract is dried, cooled at 0° C., and mixed with a solution of nitrogen dioxide in chloroform cooled at 0° C. The mixture is kept at 0° C. for 30 minutes and at room temperature overnight, thereby oxidation proceeding. From the reaction mixture, 81 g. of $\alpha$-chloroglutaric acid is obtained, which can be purified through recrystallization with ethyl ether, M.P. 97° C. The yield is 64% of the theoretical amount. Overall yield from 1,1,1,5-tetrachloropentane is 52%.

EXAMPLE 2

Twenty grams of 1,1-dichloro-5-hydroxypentene-(1), synthesized similarly as in Example 1, is mixed with 45 g. of 96% sulfuric acid under cooling. Chlorine gas is passed through the mixture kept at about 10° C. After 3 hours passing, the reaction mixture is poured into ice water, and the mixture is extracted with ethyl ether. After evaporation of ethyl ether, the extract is mixed with glacial acetic acid. To the acetic acid solution kept at a temperature below 40° C., 17 g. of potassium permanganate is added portionwise over about 2 hours under stirring. The reaction mixture is allowed to stand overnight at room temperature, then mixed with water, and extracted with ethyl ether. The ether extract yields 13.3 g. of $\alpha$-chloroglutaric acid, the yield being 62% of the theoretical amount.

In each step in the present process of the invention which comprises the steps of de-hydrogen chloride, hydrolysis, chlorine addition in acidic solvent and hydrolysis, and oxidation, starting from 1,1,1,5-tetrachloropentane, other reagents and operations than those illustrated in these examples may be employed without deviation from the spirit of the invention. For instance, in deriving 1,1-dichloro-5-hydroxypentene-(1) from 1,1,5-trichloropentene-(1) through hydrolysis, a method in which 1,1,5-trichloropentene-(1) is directly heated with an alkaline aqueous solution is practicable, besides the method illustrated in Example 1.

Compounds handled in the present invention contain chloromethyl ($ClCH_2$—), trichloromethyl ($Cl_3C$—) and dichlorovinyl ($Cl_2C$=$CH$—) radicals. Regarding chemical reactivities of these radicals, chloromethyl radical is reactive to nucleophilic reagent but inactive to electrophilic reagent. While, trichloromethyl and dichlorovinyl radicals are inactive to nucleophilic reagent but active to electrophilic reagent. In view of these facts, it would be obvious to those skilled in the art that there are a number of working embodiments other than those shown in the examples.

EXAMPLE 3

Twenty grams of 1,1-dichloro-5-hydroxypentene-(1), synthesized similarly as in Example 1, is mixed with 50 g. of pure formic acid under cooling.

The following procedure is similar to that in Example 1, and 14.6 g. of $\alpha$-chloroglutaric acid is obtained. The yield is 68% of the theoretical amount.

EXAMPLE 4

Twenty grams of 1,1-dichloro-5-hydroxypentene-(1), synthesized similarly as in Example 1, is mixed with 50 g. of glacial acetic acid under cooling.

The following procedure is similar to that in Example 1, and 14.2 g. of $\alpha$-chloroglutaric acid is obtained. The yield is 66% of the theoretical amount.

What we claim is:

1. A process of producing $\alpha$-chloroglutaric acid, which comprises chlorinating in an acid medium and hydrolyzing 1,1-dichloro-5-hydroxypentene-(1) to $\alpha$-chloro-$\delta$-hydroxyvaleric acid, by mixing the first compound with sulfuric acid, passing chlorine gas through the mixture at a temperature below 20° C., and pouring the reaction mass into water, oxidizing the $\alpha$-chloro-$\delta$-hydroxyvaleric acid to $\alpha$-chloroglutaric acid, by contacting the former with an oxidizing agent selected from the group consisting of permanganate salts, bichromate salts, anhydrous chromic acid, nitric acid and nitrogen dioxide, under non-alkaline conditions in the substantial absence of water.

2. A process according to claim 1 wherein the oxidation of $\alpha$-chloro-$\delta$-hydroxyvaleric acid is effected by contacting the same with nitrogen dioxide at a temperature below 40° C. in a solvent selected from the group consisting of chloroform and carbon tetrachloride.

3. A process of producing $\alpha$-chloroglutaric acid, which comprises chlorinating in an acid medium and hydrolyzing 1,1-dichloro-5-hydroxypentene-(1) to $\alpha$-chloro-$\delta$-hydroxyvaleric acid, by mixing the first compound with an organic acid selected from the group consisting of formic and acetic acids, passing chlorine gas through the mixture at a temperature below 20° C., and pouring the reaction mass into water, and oxidizing the $\alpha$-chloro-$\delta$-hydroxyvaleric acid to $\alpha$-chloroglutaric acid, by contacting the former with an oxidizing agent selected from the group consisting of permanganate salts, bi-chromate salts, anhydrous chromic acid, nitric acid and nitrogen dioxide under non-alkaline conditions in the substantial absence of water.

4. A process according to claim 3 wherein the oxidation of α-chloro-δ-hydroxyvaleric acid is effected by contacting the same with nitrogen dioxide at a temperature below 40° C. in a solvent selected from the group consisting of chloroform and carbon tetrachloride.

References Cited by the Examiner

UNITED STATES PATENTS 2,398,430   4/1946   Joyce _____ 260—539
2,890,241   6/1959   Holmen et al. _____ 260—539

OTHER REFERENCES

Groggins: Unit Processes in Org. Syn., 4th ed., p. 426 (1952).

Wagner et al.: Syn. Org. Chem., pp. 106, 170, and 419 (1953).

LORRAINE A. WEINBERGER, *Primary Examiner.*

LEON ZITVER, *Examiner.*

G. P. D'ANGELO, R. K. JACKSON,
*Assistant Examiners.*